Patented Nov. 14, 1933

1,934,860

UNITED STATES PATENT OFFICE 1,934,860

FUEL

Grinnell Jones, Cambridge, and Albert F. York, Winchester, Mass., assignors to S. Sternau & Company, Inc., New York, N. Y., a corporation of New York No Drawing. Application June 22, 1928
Serial No. 287,633

7 Claims. (Cl. 44—7)

The invention relates to a process for the manufacture of a fuel in gel form and to the fuel obtained thereby, more particularly to that type known as a solidified alcohol fuel, and includes correlated improvements and discoveries whereby the manufacture of such a fuel is enhanced.

An object of the invention is to provide an improved process for the manufacture of a solidified alcohol type of fuel which will yield a product in gel form of such a character that it will remain in the gel form during the usual handling processes and during transportation.

Another object of the invention is to provide a process for manufacturing a fuel which may be easily carried out and in an economical manner.

A further object of the invention is to provide a process for manufacturing a fuel which will give a firm, clear and homogeneous gel especially one that is free from cavities or air cells.

Among the other objects of the invention is the provision of a fuel in gel form containing constituents having a high heating value, and which will burn with little or no sputtering, without liquefying and with a flame depositing little if any soot.

Other objects of the invention will in part be obvious and will in part appear hereinafter.

The invention accordingly comprises the process and the several steps thereof, and the product possessing the features, properties and relation of constituents which are exemplified in the following detailed disclosure and the scope of the application of which will be indicated in the claims.

The process according to this invention is based upon the experimentally determined fact that carbohydrate derivatives, for example, a nitrocellulose, a nitrostarch, etc. which are insoluble or only slightly soluble in an organic combustible medium, as an alcoholic medium, for example, absolute ethyl alcohol, synthetic methanol, aqueous ethyl alcohol, aqueous methanol and admixtures of these are more soluble and may be dissolved in such an organic combustible medium at a sub-zero temperature, i. e. a temperature below zero degrees C. The term nitro-carbohydrate is intended to signify the nitric acid compounds of carbohydrates, as for example, nitrocellulose, nitro-starch, etc. We have also found, by experimental determination, that by a suitable combination of the degree of nitration of cellulose and of the solvents used, particularly the water content when a solvent containing water is used, there may be obtained a sol at a sub-zero temperature which may be caused to produce a satisfactory gel upon warming.

In the practice of the invention a sol containing combustible constituents is produced at a sub-zero temperature, and this sol gelled by warming or increasing the temperature toward atmospheric. More specifically the sol may be produced by dissolving a carbohydrate derivative such as a nitrocellulose, a nitrostarch, etc. in an alcohol or a mixture of alcohols, as for example, absolute ethyl, absolute methyl, 90 to 95% ethyl, 90 to 95% methyl or admixtures of these, etc. at a sub-zero temperature by effectively stirring the mixture of the alcohol and carbohydrate derivative until a clear sol is obtained, which may require several hours, and then causing gellation by warming or increasing the temperature of the sol toward ordinary room temperature. This temperature may vary somewhat according to the locality in which the process is being practiced, but for general purposes, it may be considered that room temperature is about +20 degrees C. The warming up or increasing of the temperature of the solution may be occasioned solely by irradiation from the surrounding atmosphere, or it may be brought about by direct application of a heating medium.

The production of the gel forming the fuel may be brought about also by dissolving or partially dissolving the carbohydrate derivative in a non-aqueous liquid combustible medium, then chilling to a sub-zero temperature and admixing therewith a liquid combustible medium containing an amount of water which would render the carbohydrate derivative insoluble at ordinary temperatures. This aqueous medium is chilled before admixing to the sub-zero temperature of the solution previously formed. Gellation is caused by warming up or increasing the temperature of the solution.

The sub-zero temperature required in carrying out the process, which has been found to be preferably −30 degrees C. may be attained by the utilization of various suitably adapted refrigerating agents. Mention may be made of the following: carbon dioxide snow; carbon dioxide snow and ether; calcium chloride and ordinary snow; liquid ammonia; and liquid air.

The practice of the invention may be illustrated by the following examples which present embodiments of a manner in which the fuel may be produced:

*Example I*

Dissolve 2.5 parts of a nitrocellulose, preferably one having a nitrogen content of about 12.1%, in 49 parts of absolute ethyl alcohol at a sub-zero temperature of about −30 degrees C. The formation of this solution may be facilitated by stirring, and the time required will be about two hours. There is then added 51 parts of ethyl alcohol containing about 6 parts of water. The aqueous alcohol is chilled to about −30 degrees C. previous to the addition. The stirring is continued and when a clear sol is obtained, it is filled into suitable containers, as for example, metal cans of desired size. Gellation is then caused by warming to ordinary atmospheric temperature, i. e. about +20 degrees C.

The nitrocellulose dissolves quite readily in the cold alcohol and after the addition of the aqueous alcohol it solidifies quickly upon becoming warm. There results a firm jelly which does not contract or pull away from the sides of the container and which exhibits very little, if any, syneresis, i. e., exudation of liquid. The fuel so produced burns with a high and intense flame and with little soot deposition.

It has been found that the amount of water which may be employed varies with the variety of nitrocellulose used. The higher the nitration, the less the amount of water; for example, with a nitrocellulose having a nitrogen content of about 12.1%, satisfactory use may be made of 5% water, whereas, with a nitrocellulose having about 11% nitrogen content, use may be made of 8% water.

*Example II*

Dissolve 2.8 parts of a nitrocellulose, having a nitrogen content of about 11.5%, in 47 parts of absolute ethyl alcohol. Then cool the solution to about −30 degrees C. and admix with 46 parts of 90% aqueous ethyl alcohol, also chilled to −30 degrees C. The admixture is stirred until a clear sol is obtained, whereupon it is filled into suitable containers and gelled in accordance with the procedure set forth in Example I.

*Example III*

Dissolve 2.8 parts of a nitrocellulose, having a nitrogen content of about 12%, in a mixture containing 79 parts of absolute ethyl alcohol and 20 parts synthetic methanol at a temperature of about −30 degrees C. The mixture is stirred until a clear sol is obtained and then the cold solution is filled into suitable containers, wherein it is solidified by warming to ordinary atmospheric temperature.

As a preferred range of nitrogen content of the nitrocellulose to be utilized, mention may be made of a nitrogen content approximately within the range of 10.5% to 12.5%, it being understood that the range not only includes the figures mentioned but figures approximating the same on either side thereof.

In the process, attention is given to the variety of the carbohydrate derivative, for example, a nitrocellulose, which is employed. In carrying out the invention a variety of nitrocellulose may be taken which is relatively soluble in an alcohol at room temperature and dissolved at room temperature in an absolute alcohol, as ethyl or methyl alcohol, this solution chilled to a sub-zero temperature and admixed with an aqueous alcohol containing 5 to 10% of water, previously cooled to such sub-zero temperature, and the gel formed by warming.

The character of the gel and its solidity or firmness will vary according to the amount of the carbohydrate derivative, as a nitrocellulose, contained therein. This is for the reason that the carbohydrate derivative is the disperse phase of the coloidal solution, and forms the supporting structure for the gel which consists largely of the dispersion medium or liquid. The material in liquid phase is caused to appear solid because of the distribution of the carbohydrate derivative. Accordingly, with a low percentage or concentration of the carbohydrate derivative, the gel will be weak and lacking in firmness, but an increase in the percentage of the carbohydrate derivative will occasion greater firmness of the gel and also greater stability. Products exhibiting satisfactory firmness and stability have been obtained with 2½% of a nitrocellulose of relatively high nitration, say 12.1 to 12.5% nitrogen, whereas on the other hand, a nitrocellulose of around 11% nitrogen, may require as much as 7% nitrocellulose.

It will be understood, of course, that the use of ethyl alcohol in accordance with this process may be in the denatured form. For the purpose of denaturing, the formulæ approved by the Government will be used. Denaturants such as approved wood alcohol, aldehol, gasoline, butyl alcohol and so on, may be utilized.

The fuel produced in accordance with the invention exhibits the following desirable characteristics: high heating value; little, if any, syneresis; burns with a practically soot-free flame, without undue sputtering, without liquefaction and without objectionable odor; is easy to ignite; may be readily extinguished and readily reignited; forms no crust while burning; and leaves very little residue. In the event that the height of the flame and the tendency to soot and to sputter are greater than desired, these may be decreased by an increase in the amount of air supplied to the burning material.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A process of manufacturing a firm fuel, which comprises bringing together nitrocellulose and an absolute monohydric alcohol having not more than two carbon atoms, said nitrocellulose being insoluble therein at ordinary temperatures subjecting the same to a temperature not higher than −20° C., adding in an amount which is not materially less than the amount of the absolute alcohol an aqueous monohydric alcohol having not more than two carbon atoms chilled to a substantially similar temperature, and warming to atmospheric temperature.

2. A process of manufacturing a firm fuel, which comprises bringing together a nitrocellulose and absolute ethyl alcohol, said nitrocellulose being insoluble therein at ordinary temperatures subjecting the same to a temperature of about −30° C., adding in an amount which is not materially less than the amount of the absolute alcohol aqueous ethyl alcohol chilled to a similar temperature, and warming to atmospheric temperature.

3. A process of manufacturing a firm fuel, which comprises dissolving a nitrocellulose in an absolute monohydric alcohol having not more than two carbon atoms at a temperature not higher than −20° C., said nitrocellulose being insoluble therein at ordinary temperatures adding in an amount which is not materially less than the amount of absolute alcohol an aqueous monohydric alcohol having not more than two carbon atoms chilled to a similar temeprature, and warming to atmospheric temperature.

4. A process of manufacturing a firm fuel, which comprises dissolving a nitrocellulose in absolute ethyl alcohol at a temperature not higher than −20° C., said nitrocellulose being insoluble therein at ordinary temperatures adding in an amount which is not materially less than the amount of the absolute alcohol an aqueous monohydric alcohol having not more than two carbon atoms chilled to a similar temperature, and warming to atmospheric temperature.

5. A process of manufacturing a firm fuel, which comprises dissolving nitrocellulose having a nitrogen content approximately within the range of 10.5% to 12.5% in absolute ethyl alcohol at a temperature not higher than −30° C., said nitrocellulose being insoluble therein at ordinary temperatures adding in an amount which is not materially less than the amount of the absolute alcohol aqueous ethyl alcohol chilled to a similar temperature, and warming to atmospheric temperature.

6. A process of manufacturing a firm fuel, which comprises dissolving nitrocellulose having a nitrogen content approximately within the range of 10.5% to 12.5% in a mixture of absolute methyl alcohol and absolute ethyl alcohol at a temperature not higher than −20° C., said nitrocellulose being insoluble therein at ordinary temperatures adding in an amount which is not materially less than the amount of the absolute alcohol aqueous ethyl alcohol chilled to a similar temperature, and warming to atmospheric temperature.

7. A process of manufacturing a firm fuel, which comprises bringing together a nitrocellulose and absolute ethyl alcohol, said nitrocellulose being insoluble therein at ordinary temperatures subjecting the same to a temperature of about −30° C., adding in an amount which is not materially less than the amount of the absolute alcohol aqueous ethyl alcohol chilled to a similar temperature, and warming to atmospheric temperature, the proportion of said nitrocellulose being not more than 7% of the whole.

GRINNELL JONES.
ALBERT F. YORK.